United States Patent [19]

Hanada et al.

[11] 4,293,479

[45] Oct. 6, 1981

[54] HEAT CURABLE MOLDING COMPOSITION

[75] Inventors: Tsuneo Hanada; Taro Koshii; Hideo Shinmi, all of Ichihara, Japan

[73] Assignee: Toray Silicone Company, Ltd., Tokyo, Japan

[21] Appl. No.: 101,324

[22] Filed: Dec. 6, 1979

Related U.S. Application Data

[63] Continuation-in-part of Ser. No. 867,067, Jan. 5, 1978.

[30] Foreign Application Priority Data

Feb. 18, 1977 [JP] Japan .................................. 52-16072

[51] Int. Cl.$^3$ .............................................. C08L 63/00
[52] U.S. Cl. ............................. 260/37 EP; 260/37 SB
[58] Field of Search ....................... 260/37 EP, 37 SB; 423/337

[56] References Cited

U.S. PATENT DOCUMENTS

| | | | |
|---|---|---|---|
| 2,573,057 | 10/1951 | Porter | 423/337 |
| 3,311,451 | 3/1967 | Biegler et al. | 423/337 |
| 3,674,430 | 7/1972 | Illigen et al. | 423/337 |
| 3,763,080 | 10/1973 | Deuter | 260/42.28 |

*Primary Examiner*—Lewis T. Jacobs
*Attorney, Agent, or Firm*—Robert L. McKellar

[57] ABSTRACT

What is disclosed is an improved heat curable molding composition which has increased flowability in the mold. The improvement is gained by the use of a fine, spherical noncrystalline filler along with the normal molding compound fillers.

4 Claims, No Drawings

HEAT CURABLE MOLDING COMPOSITION

BACKGROUND OF THE INVENTION

This application is a continuation-in-part of application Ser. No. 867,067 filed Jan. 5, 1978 pending.

This invention is concerned with a heat curable resin composition which possesses a low coefficient of thermal expansion and a high flowability during the forming process.

Large dies for low pressure transfer molding have recently been developed in the semiconductor field. In order to avoid a premature filling of these large dies and to produce satisfactory molding characteristics, molding materials must be used which have excellent flow characteristics and an EMMI spiral flow length at least exceeding 40 inches.

Heretofore, there have been several methods by which the viscosity of the resin composition was reduced in order to induce higher flowability in the molding process. For example, the amount of filler used in the composition has been reduced but even though flowability was enhanced, the lack of filler inherently increased the resin/filler ratio which often led to molding compositions with a very high coefficient of thermal expansion. In addition, it is undesirable from an economic point of view to leave out the low cost fillers.

A second method of increasing the flow of molding compounds is by controlling the cure rate by adjusting the level of curing agent and auxiliary curing agent. This method suffers generally from variablity in the finished part because of the inability to control precisely the curing agents. Both electrical and mechanical properties of the part are affected by inadequate cure. Further, controlling the flow properties by reduced curing creates variability in the mechanical properties of the part. Moreover, the flowability is not significantly altered by this method.

A third method for increasing flowability is to use resins with low melt viscosities or to blend high melt viscosity resins with liquid resins. These compositions, however, cause resin bleeding in the final product which also leads to reduced molding efficiency.

A fourth method of increasing flowability is to use fillers having a very fine particle size. For example, silicone resins containing large quantities of filler with a particle size below 10 microns can improve the molding materials flowability. With epoxy resins, the molding material's flowability can be improved by combining a filler having an average particle size between 45 and 100 microns with another filler having a particle size below 44 microns in the proper ratio. Even though this method is effective, it is not completely satisfactory and a composition with high spiral flow is needed.

THE INVENTION

If the spiral flow of a molding compound can be improved, better molding characteristics can be obtained. If the spiral flow can be improved and the amount of filler increased at the same time, better electrical and mechanical properties can be obtained.

It is therefore an object of the present invention to increase the filler content of resinous molding compounds thereby enhancing the electrical and mechanical properties of the molded parts.

It is a further object of this invention to improve the flowability of the molding compound so that greater molding efficiency is achieved.

The above objects are achieved by using an improved heat curable molding composition which consists of (A) 100 parts of a heat curable molding resin; (B) up to 400 parts of a filler, the improvement comprising replacing 5-80 weight percent of (B) with a spherical non-crystalline silica filler having an average particle size of 1-800 millimicrons which has been prepared by vaporization of high purity sand or quartz in the absence of hydrogen or natural gas and subsequently condensed.

The above molding composition has improved spiral flow, better molding characteristics and the quantity of filler is increased over conventional molding compounds such that the electrical and mechanical properties are improved. The molded products have relatively low coefficient of thermal expansion which improves the adhesion of the compounds to metals and ceramics. In addition, the moisture resistance of the molded parts is improved.

The inventors investigated various techniques for improving the spiral flow of molding materials. They discovered that the addition of spherical noncrystalline silica fillers can significantly improve the flowability during molding. Spherical noncrystalline silica fillers have not previously been used as fillers for molding materials because they are too fine and because their use does not improve the flowability when they are used alone.

In other words, this invention concerns a heat curable resin (A) which contains a filler (B) with an average particle size exceeding $1\mu$ and, a spherical noncrystalline silica filler with an average particle size of 1 to 800 $m\mu$. The spherical noncrystalline silica filler comprises 5 to 80 weight % of the total filler, that is, 5-80 weight percent of (B) is spherical noncrystalline silica filler. The total quantity of (B) in the composition is 100-400 parts per 100 parts of (A). Especially preferred is 200-400 parts of (B).

The spherical noncrystalline silica filler with an average particle size of 1 to 800 $m\mu$ which is used in this invention may be completely spherical or may contain some small amount (less than 10 weight percent) of semispherical particles and the filler particles must be homogeneous. A nonspherical inorganic filler with an average particle size within the above-mentioned range may reduce the flowability during molding, but it certainly cannot increase the flowability. Even when spherical particles are used, if secondary particles form in the inorganic filler the flowability during molding may be reduced and cannot be recovered.

If the average particle size of the spherical noncrystalline silica filler exceeds 800 $m\mu$, the improvement in flowability during molding is reduced. On the other hand, it is difficult to obtain fillers with an average particle size below 10 $m\mu$ and the preferred range for the average particle size is therefore 10 to 500 $m\mu$.

The quantity of spherical noncrystalline silica filler varies according to the following factors: (1) the average particle size, (2) the average particle size and type of the other filler with average particle sizes exceeding $1\mu$, (3) the type of heat curable resin. The spherical noncrystalline silica filler generally comprises 5 to 80 wt % of the total filler (B) and preferably 10 to 60 wt % of the total filler.

In addition, suitable surface treatments on the spherical silica may be carried out depending upon the affinity toward the resins and the properties of the other filler.

An example of a spherical noncrystalline silica filler is a fumed silica produced by the thermal reduction of silica with coke at about 1,200° C. which is oxidized by air at these high temperatures to produce silicon dioxide. Another example is a fumed silica produced by the pyrolytic degradation of zirconium silicate or zircon sand at 1800° C. or above. These silicon dioxides are completely spherical noncrystalline silicas and can be easily and inexpensively produced.

By way of example, the production process for silica from zirconium silicate is illustrated:

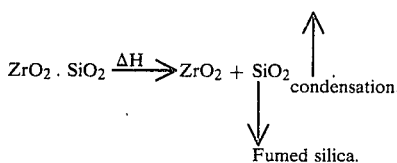

The fumed silicas herein are to be distinguished from conventional fume silicas prepared by burning chlorosilanes and from fillers produced by vaporization in the presence of hydrogen or natural gas.

The conventional fillers with an average particle size above $1\mu$ which are used with the spherical noncrystalline silica filler are crystalline silica, noncrystalline silica, natural silica, talc powder, calcium carbonate, diatomaceous earth, calcium silicate, aluminum silicate, magnesium silicate, zirconium silicate, alumina, aluminum hydroxide, titanium oxide, glass beads, glass balloons and fibrous fillers such as glass fiber, asbestos fiber, synthetic fiber and natural fiber.

The heat curable resins used in this invention are not critical. Any of the well-known molding resins can be used. Examples of these resins are: silicone resins, epoxy resins, phenol resins, polyester resins, polyimide resins, polyurethane resins, copolymers of diallylphthalate with the above resins and mixtures of such resins. Silicone resins, epoxy resins, silicone epoxy copolymer resins and mixtures of two or more of these resins are particularly preferable.

Curing agents are used in this invention and these include any curing agent which can cure the heat curable resins. The ratio among the heat curable resin, filler and curing agent will vary with the particle sizes and component types and the composition will therefore be determined on the basis of providing optimal conditions. The order in which the filler and curing agent is added is also not critical. Mold releasing agents, pigments, curing accelerators, curing inhibitors, flame retardants, auxiliary flame retardants and bonding agents may be added when desirable.

This invention's heat curable resin composition is prepared by the usual methods for preparing heat curable resin molding materials. All the ingredients are melted and blended in a roll mill, kneader-mixer, Banbury mixer or extruder. The melted and blended mixture is then cooled to bring about solidification and the solidified product is then crushed to the desired size.

The invention is described in detail in the following examples.

However, this invention is not limited to these examples.

"Parts" and "%" in the examples indicate "parts by weight" and "weight %" respectively.

EXAMPLE 1

A cresol novolak epoxy resin (100 parts) (ECN-1280 produced by Ciba-Geigy Co., Ltd.), a phenol novolak epoxy resin (30 parts) (HT-9490 produced by Ciba-Geigy Co., Ltd.), 2-methylimidazole (0.5 parts), carnauba wax (3 parts) and filler (300 parts) were placed in a double roll mill and blended well at about 90° C. The filler was a mixture of fused silica powder (specific gravity 2.2, 60% of the powder passes through a 325 mesh sieve) and spherical noncrystalline silica with an average particle size of 50 m$\mu$ (specific gravity 1.95). The filler compositions are given in Table I. The blended material was formed into a sheet and cooled. The formed product was then crushed for use as a molding material.

The flowability during molding was measured by the EMMI spiral flow length at 175° C. The plunger's movement was recorded electrically and the flow time was measured by the time elapsed until the plunger's movement stopped.

The molding was carried out at 175° C. for 3 minutes at a molding pressure of 60 kg/cm$^2$. The completion of curing was determined using the Barcol hardness (measured with a Barcol hardness tester 935) 10 seconds after releasing the molding pressure.

Table I reports the spiral flow length, the flow time and the hot Barcol hardness for the various ratios between the two filler types.

It was found that when the spherical noncrystalline silica comprises 30% of the total filler, the spiral flow length increases by 50% over that of a sample lacking spherical noncrystalline silica.

The spiral flow length reached a maximum as the percentage of spherical noncrystalline silica increased. The results in the following examples were obtained with a molding material containing spherical noncrystalline silica at the percentage giving the maximum spiral flow length.

EXAMPLE 2

Solid phenylmethylpolysiloxane resin (100 parts) (ratio of phenyl groups to silicon atoms 0.6:1, ratio of methyl groups to silicon atoms 0.5:1, 6% silicon-bound hydroxy groups), glass fiber with an average length of about 1.6 mm (100 parts), fused silica powder (180 parts, more than 99.5% passes through a 325 mesh sieve), spherical noncrystalline silica with an average particle size of 30 m$\mu$ (20 parts, 6.7% of the total filler, specific gravity 1.95), calcium stearate (1 part), lead carbonate (1 part) and benzoic acid (1 part) were placed in a double roll mill and blended well at 90° C. The blended material was formed into a sheet, cooled and crushed. This crushed material was designated molding material (I).

The same components, with the exception of the spherical noncrystalline silica which was replaced with fused silica powder (200 parts 99.5% passing through a 325 mesh sieve), were blended and a molding material was prepared as described above. This material was designated molding material (II).

The spiral flow length, flow time and hot Barcol hardness of these molding materials are measured as described in Example 1 (and the results are given in Table II).

EXAMPLE 3

The ratio between the fused silica powder (99.5% passing through a 325 mesh sieve) and the spherical noncrystalline silica was maintained as in Example 2, but the silicone resin content was reduced to 20%. In other words, solid phenylmethylpolysiloxane resin (100 parts), fused silica powder (240 parts), spherical noncrystalline silica (60 parts), glass fiber with an average length of 1.6 mm (100 parts), calcium stearate (1 part), lead carbonate (1 part) and benzoic acid (1 part) were blended and molding material (III) was prepared as described in Example 2.

Material (III) was molded at 175° C. for 3 minutes at a molding pressure of 60 kg/cm². Postcure was 15 hours at 175° C. The molded product's coefficient of thermal expansion was measured.

For the purposes of comparison, the coefficient of thermal expansion was measured for molding material (II).

The results are given in Table III.

The spiral flow length of the resulting molding material was about 100 cm and its coefficient of thermal expansion was relatively low.

EXAMPLE 4

A phenol novolak epoxy resin (Epicoat 154 produced by Shell Chemical Co., Ltd.) (50 parts), the phenylmethylpolysiloxane used in Example 2 (50 parts), fused silica powder (99.5% passing through a 325 mesh sieve (240 parts), spherical noncrystalline silica with an average particle size of 30 mμ (specific gravity: 1.95) (60 parts, 20% of the total silica filler) stearic acid (3 parts) and aluminum benzoate (1.5 parts) were placed in a double roll mill and blended well at 60° C. The blended material was formed, cooled and crushed to obtain molding material (IV).

For the purposes of comparison, molding material (V) was prepared by replacing the spherical noncrystalline silica with fused silica powder so that fused silica powder comprised the total silica filler.

The resulting spiral flow length, flow time and hot Barcol hardness at 175° C. are given in Table IV.

It was found that the spiral flow length of the molding material containing 20% spherical noncrystalline silica of the total filler was 77% larger than the spiral flow length of the molding material prepared without spherical noncrystalline silica.

EXAMPLE 5

A comparative example was run to show the difference in physical properties of the final molded compound when fume silicas prepared from chlorosilanes were substituted for the fume silicas of the instant invention. The comparison was carried out by preparing samples as was done in Example 1. Table V shows the materials and the amount of each used. The results are in Table VI.

TABLE I

| | Experiment No. | | | | |
|---|---|---|---|---|---|
| | 1 | 2 | 3 | 4 | 5 |
| Fused silica powder (parts) | 300 | 270 | 240 | 210 | 180 |
| Spherical noncrystalline silica (parts) | 0 | 30 | 60 | 90 | 120 |
| Spiral flow length (cm) | 84 | 102 | 114 | 127 | 109 |
| | | (21%) | (36%) | (49%) | (28%) |
| Flow time (seconds) | 17 | 16 | 17 | 17 | 18 |
| Hot Barcol hardness | 76 | 75 | 75 | 74 | 67 |

TABLE II

| | Molding Material (I) | Molding Material (II) |
|---|---|---|
| Spiral flow length (cm) | 130 | 114 |
| Flow time (seconds) | 19 | 22 |
| Hot Barcol hardness | 60 | 60 |

TABLE III

| | Molding Material (III) | Molding Material (II) |
|---|---|---|
| Silicon resin content (%) | 20 | 25 |
| Spiral flow length (cm) | 99 | 114 |
| Flow time (seconds) | 18 | 22 |
| Hot Barcol hardness | 62 | 60 |
| Coefficient of thermal expansion (30-150° C.) | $2.7 \times 10^{-3}$ | $3.2 \times 10^{-3}$ |

TABLE IV

| | Molding Material IV | Molding Material V |
|---|---|---|
| Spiral flow length (cm) | 94 | 53 |
| Flow time (seconds) | 11 | 12 |
| Hot Barcol hardness | 80 | 80 |

TABLE V

| | Experiment No. | | | |
|---|---|---|---|---|
| Material in parts | 1 | 2 | 3 | 4 |
| Fused Silica Powder | 300 | 240 | 240 | 240 |
| Spherical Non-Crystalline Silica (as in Example 1) | 0 | 60 | 0 | 0 |
| Cab-O-Sil M-5 (fume silica from chlorosilanes) | 0 | 0 | 60 | 0 |
| Spherical Non-Crystalline Silica (from zircon sand) | 0 | 0 | 0 | 60 |

TABLE VI

| | Experiment No. | | | |
|---|---|---|---|---|
| | 1 | 2 | 3 | 4 |
| Spiral flow (cm) | 84 | 114 | 74 | 120 |
| Flow time (seconds) | 17 | 17 | 16 | 18 |
| Hot Barcol hardness | 76 | 75 | 77 | 75 |

That which is claimed is:

1. An improved heat curable molding composition which consists of
   (A) 100 parts of a heat curable molding resin;
   (B) up to 400 parts of a filler;
   the improvement comprising replacing 5-80 weight percent of (B) with a spherical non-crystalline silica filler having an average particle size of 1-800 millimicrons which has been prepared by vaporization of high purity sand or quartz in the absence of hydrogen or natural gas and subsequently condensed.

2. A heat curable molding compound as claimed in claim 1 wherein the resin (A) is present in 100 parts and (B) is present in 200-400 parts for every 100 parts of (A).

3. A heat curable molding compound as claimed in claim 1 wherein the resin (A) is selected from a group consisting of silicone resins, epoxy resins and silicone-epoxy copolymer resins or mixtures thereof.

4. A heat curable molding compound as claimed in claim 3 wherein (B) is 90-40 weight percent glass fiber and 10-60 weight percent spherical silica both based on the total weight of (B) present in the composition.

* * * * *